US012350834B2

(12) United States Patent
Wang et al.

(10) Patent No.: US 12,350,834 B2
(45) Date of Patent: Jul. 8, 2025

(54) SYSTEM FOR TESTING AND TRAINING ROBOT CONTROL

(71) Applicant: Acumino, Renton, WA (US)

(72) Inventors: Ke Wang, Charlottesville, VA (US); Patrick McKinley Jarvis, Redmond, WA (US); Minas Liarokapis, Auckland (NZ)

(73) Assignee: ACUMINO, Renton, WA (US)

( * ) Notice: Subject to any disclaimer, the term of this patent is extended or adjusted under 35 U.S.C. 154(b) by 0 days.

(21) Appl. No.: 18/538,196

(22) Filed: Dec. 13, 2023

(65) Prior Publication Data

US 2024/0189993 A1    Jun. 13, 2024

Related U.S. Application Data

(60) Provisional application No. 63/387,239, filed on Dec. 13, 2022.

(51) Int. Cl.
*B25J 9/16* (2006.01)
*B25J 19/02* (2006.01)
(52) U.S. Cl.
CPC .............. *B25J 9/163* (2013.01); *B25J 9/1697* (2013.01); *B25J 19/023* (2013.01)
(58) Field of Classification Search
CPC ........... B25J 9/163; B25J 9/1697; B25J 9/023
See application file for complete search history.

(56) References Cited

U.S. PATENT DOCUMENTS 6,239,784 B1    5/2001  Holmes
8,965,576 B2    2/2015  Chen et al.
(Continued)

FOREIGN PATENT DOCUMENTS

WO    2019046559 A1    3/2019
WO    2021101522 A1    5/2021

OTHER PUBLICATIONS

Abdulraham Al-Shanoon, Developing a Mobile Manipulation System to Handle Unknown and Unstructured Objects, Thesis, University of Ontario Institute of Technology, Apr. 2021.
(Continued)

*Primary Examiner* — Bhavesh V Amin
(74) *Attorney, Agent, or Firm* — Orrick, Herrington & Sutcliffe LLP

(57) ABSTRACT

A method for training and/or testing a robot control module. The method includes generating an instruction specified by a robot control module configured for robot training and/or testing, the instruction indicating how a human-driven robot task is to be performed when training and/or testing the robot control module; providing the instruction to a mixed reality device worn by a human data collector, the mixed device rendering the instruction in a manner that shows the human data collector how to perform the human-driven robot task; collecting performance data and environmental data in response to the human data collector attempting to perform the human-driven robot task using the data collection device; receiving feedback data in response to the human data collector attempting to perform the human-driven robot task specified by the instruction; and updating the robot control module using the feedback data and the collected performance and environmental data.

20 Claims, 12 Drawing Sheets

(56) References Cited

U.S. PATENT DOCUMENTS

| | | | |
|---|---|---|---|
| 10,166,680 B2 | 1/2019 | Hemken | |
| 10,362,299 B1 | 7/2019 | Niemeyer et al. | |
| 10,471,594 B2 | 11/2019 | Bergstra et al. | |
| 10,675,766 B1 | 6/2020 | Niemeyer et al. | |
| 10,737,385 B2 | 8/2020 | Shibasaki et al. | |
| 10,768,708 B1 | 9/2020 | Sills et al. | |
| 10,919,152 B1 | 2/2021 | Kalouche | |
| 11,126,405 B1 | 9/2021 | Pasic et al. | |
| 11,341,826 B1 | 5/2022 | Wiley et al. | |
| 11,410,024 B2* | 8/2022 | Barik | G06N 5/01 |
| 12,001,944 B2* | 6/2024 | Barik | G06N 5/01 |
| 2010/0092267 A1 | 4/2010 | Najdovski et al. | |
| 2012/0075168 A1* | 3/2012 | Osterhout | G06F 3/017 345/8 |
| 2012/0194418 A1* | 8/2012 | Osterhout | G02B 27/0149 345/156 |
| 2012/0194419 A1* | 8/2012 | Osterhout | G02B 27/017 345/156 |
| 2012/0194420 A1* | 8/2012 | Osterhout | G06F 3/013 345/156 |
| 2012/0194549 A1* | 8/2012 | Osterhout | G06Q 30/02 345/633 |
| 2012/0194550 A1* | 8/2012 | Osterhout | G06F 1/163 345/633 |
| 2012/0194551 A1* | 8/2012 | Osterhout | G06F 3/005 345/633 |
| 2014/0240109 A1 | 8/2014 | Aviles et al. | |
| 2016/0059407 A1 | 3/2016 | Sonoda | |
| 2016/0059412 A1* | 3/2016 | Oleynik | B25J 19/02 700/250 |
| 2016/0256232 A1 | 9/2016 | Awtar et al. | |
| 2016/0346923 A1 | 12/2016 | Kesil et al. | |
| 2016/0349835 A1 | 12/2016 | Shapira | |
| 2017/0061365 A1* | 3/2017 | Nonoyama | H05K 13/02 |
| 2017/0151667 A1* | 6/2017 | Bergstra | B25J 9/1656 |
| 2018/0188715 A1* | 7/2018 | Cella | H04W 84/18 |
| 2018/0284758 A1* | 10/2018 | Cella | G05B 23/0264 |
| 2018/0314936 A1* | 11/2018 | Barik | G06F 9/46 |
| 2019/0041842 A1* | 2/2019 | Cella | G06N 5/046 |
| 2019/0121350 A1* | 4/2019 | Cella | G05B 19/41875 |
| 2019/0282324 A1* | 9/2019 | Freeman | A61H 31/005 |
| 2019/0324439 A1* | 10/2019 | Cella | G06N 3/042 |
| 2019/0324444 A1* | 10/2019 | Cella | G06N 3/088 |
| 2019/0339688 A1* | 11/2019 | Cella | H04L 1/18 |
| 2019/0389061 A1 | 12/2019 | Kwak | |
| 2020/0030979 A1 | 1/2020 | Bank et al. | |
| 2020/0050342 A1 | 2/2020 | Lee | |
| 2020/0078951 A1 | 3/2020 | Kamoi | |
| 2020/0098181 A1 | 3/2020 | Campbell | |
| 2020/0101599 A1 | 4/2020 | Yoshida | |
| 2020/0103894 A1* | 4/2020 | Cella | G05B 23/0289 |
| 2020/0133257 A1* | 4/2020 | Cella | G05B 19/4183 |
| 2020/0225655 A1* | 7/2020 | Cella | G05B 23/0221 |
| 2020/0348662 A1* | 11/2020 | Cella | G05B 19/41865 |
| 2021/0023702 A1 | 1/2021 | Lipay et al. | |
| 2021/0023711 A1 | 1/2021 | Lee et al. | |
| 2021/0068988 A1 | 3/2021 | Ho | |
| 2021/0122045 A1 | 4/2021 | Handa et al. | |
| 2021/0125052 A1 | 4/2021 | Tremblay et al. | |
| 2021/0138655 A1 | 5/2021 | Mousavian et al. | |
| 2021/0157312 A1* | 5/2021 | Cella | G01M 13/045 |
| 2021/0162605 A1 | 6/2021 | Gadre | |
| 2021/0237275 A1* | 8/2021 | Stone | B25J 9/1689 |
| 2022/0108262 A1* | 4/2022 | Cella | G05B 17/02 |
| 2022/0228710 A1 | 7/2022 | Asbeck et al. | |
| 2023/0017304 A1* | 1/2023 | Barik | G06N 3/044 |
| 2023/0176557 A1* | 6/2023 | Cella | G05B 23/024 700/117 |
| 2023/0186201 A1* | 6/2023 | Cella | G05B 19/4183 705/7.17 |

OTHER PUBLICATIONS

Quan Vuong, Machine Learning for Robotic Manipulation, Jan. 4, 2021.

Shuran Song et al., Grasping in the Wild: learning 6DoF Closed-Loop Grasping from Low-Cost Demonstrations, IEEE Robotics and Automation Letters, Jun. 17, 2020. https://graspinwild.cs.columbia.edu.

Zhenjia Xu et al., AdaGrasp: Learning an Adaptive Gripper-Aware Grasping Policy, Mar. 14, 2021. Retrieved from https://adagrasp.cs.columbia.edu.

International Search Report from corresponding PCT Application PCT/US2022/042936, Dec. 9, 2022.

International Search Report from Corresponding PCT Application No. PCT/US2023/083738, Apr. 8, 2024.

* cited by examiner

SYSTEM FOR TESTING AND TRAINING ROBOT CONTROL

CROSS-REFERENCE TO RELATED APPLICATIONS

This application claims the benefit of and priority to U.S. Provisional Patent Application No. 63/387,239, filed on Dec. 13, 2022, which is incorporated herein by reference in its entirety.

FIELD OF THE DISCLOSURE

The disclosure relates to testing a trained robot control system that is used in control of a robot and/or training of a system to be used in future control of a robot without using a real robot or teleoperation.

BACKGROUND

In order to control robots in performing various robot control tasks, it is often necessary to train one or more machine learning models and other software that are used in a robot control system. However, it can be difficult to obtain sufficient data in an easy, scalable, and cost-efficient manner to train the machine learning models and other software.

In addition, in some circumstances, a party will have one or more machine learning models and other software that have been at least initially trained to be applied in the robot control system. However, it is often necessary to test the machine learning models and other software to determine if they are properly trained and to also refine the models as needed. Such testing is particularly difficult in scenarios involving human workers or residents such as in offices, homes, hospitals, or the like. In such scenarios, it could be dangerous to test the robot control system using an actual robot since it is unknown if the robot could safely operate in the office, home, hospital, or the like. In addition, existing laws and regulations might prohibit the use of robots during testing. Again, in such scenarios it is difficult to test the machine learning models in an easy, fast, and cost-efficient manner.

Accordingly, there exists a need in the art to provide systems and methods that allow for the training and/or testing of machine learning models and other software that are used in robot control systems in an easy, fast, and cost-efficient manner.

SUMMARY

Embodiments disclosed herein are related to a testing and/or training system for testing and/or training of machine learning models and other software used in robot control systems. The testing and/or training system in one embodiment includes at least the following elements: 1) visual sensing devices, 2) a mixed reality device, 3) a data collection device, 4) a computation device including a machine learning model or other software that is to be tested and/or trained, and 5) a storage device that records sensing and controlling data that is collected during the testing and/or training.

In some embodiments, the visual sensing devices include multiple cameras, such as depth cameras, which are located on the data collection device, bird-view cameras and/or depth cameras, which are located on a wall or ceiling of a testing and/or training location, and other cameras and types of visual sensors as needed. The various cameras are configured to detect a pose of a person performing the testing and/or training, a pose of the data collection device such as a human-machine interface, and other end effectors such as hands or gloves, and/or an object being manipulated by the data collection device.

In some embodiments, the mixed reality device is a platform that allows a human data collector to communicate with the various other elements of the testing and/or training system. The human data collector also receives and visualizes via the mixed reality device instructions and feedback from the computation device that direct the human data collector to perform various robot control tasks related to testing and/or training the machine learning model.

In some embodiments, the data collection device is worn by the human data collector and is used to perform the various robot control tasks related to testing and/or training the machine learning model or other software. The data collection device includes various cameras and sensors that are configured to collect data related to the performed robot control tasks. In some embodiments, the data collection device is a forearm-mounted human-machine operation interface that is used to operate one or more robotic grippers or robotic hands in the execution of complex grasping and manipulation robot control tasks. In other embodiments, the data collection device is a palm-mounted human-machine operation interface that is used to operate one or more robotic grippers or robotic hands in the execution of complex grasping and manipulation robot control tasks. In still other embodiments, the hands and/or arms of the human data collector can be considered as the data collection device. In such embodiments, the visual sensing devices that are mounted on the wall or the ceiling of the testing and/or training location can track the hands and/or arms of the human data collector in the execution of the grasping and manipulation robot control tasks. In further embodiments, the data collection device can be sensing gloves or hand pose tracking devices, such as motion capture gloves. In still further embodiments, the data collection device can be considered any combination of the human-machine operation interface, the human data collector hands and/or arms, the sensing gloves, or the hand pose tracking devices.

In some embodiments, the computation device oversees real-time synchronization of multiple data resources, data processing, and data visualization by providing commands to and receiving collected data from the other elements of the testing and/or training system. As mentioned, the computation device includes the machine learning model and other software that is being trained and/or tested. In some embodiments, the computation device includes processing capabilities that allow it to execute the machine learning model and the other software so that the machine learning model and other software can be trained and/or tested.

The storage device includes storage capabilities so that the data collected from the other elements of the testing and/or training system can be stored and then used to train and/or test the robot control system.

These and other features, aspects, and advantages of the present disclosure will become better understood through the following description, appended claims, and accompanying drawings.

Figure 1A:
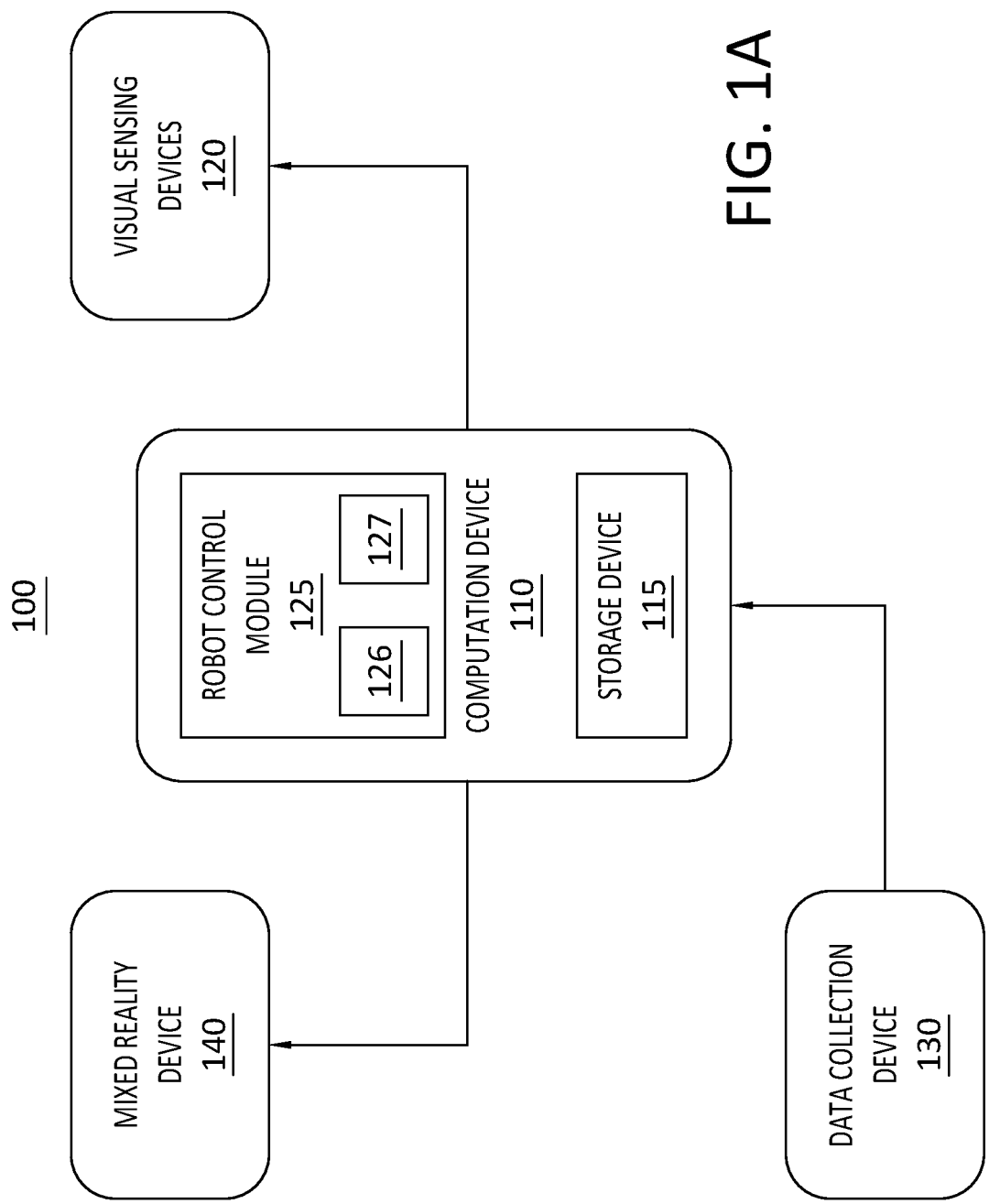
FIGS. 1A-1E illustrate an environment for training and/or testing machine learning models use in controlling robotic systems.
Figure 1B:
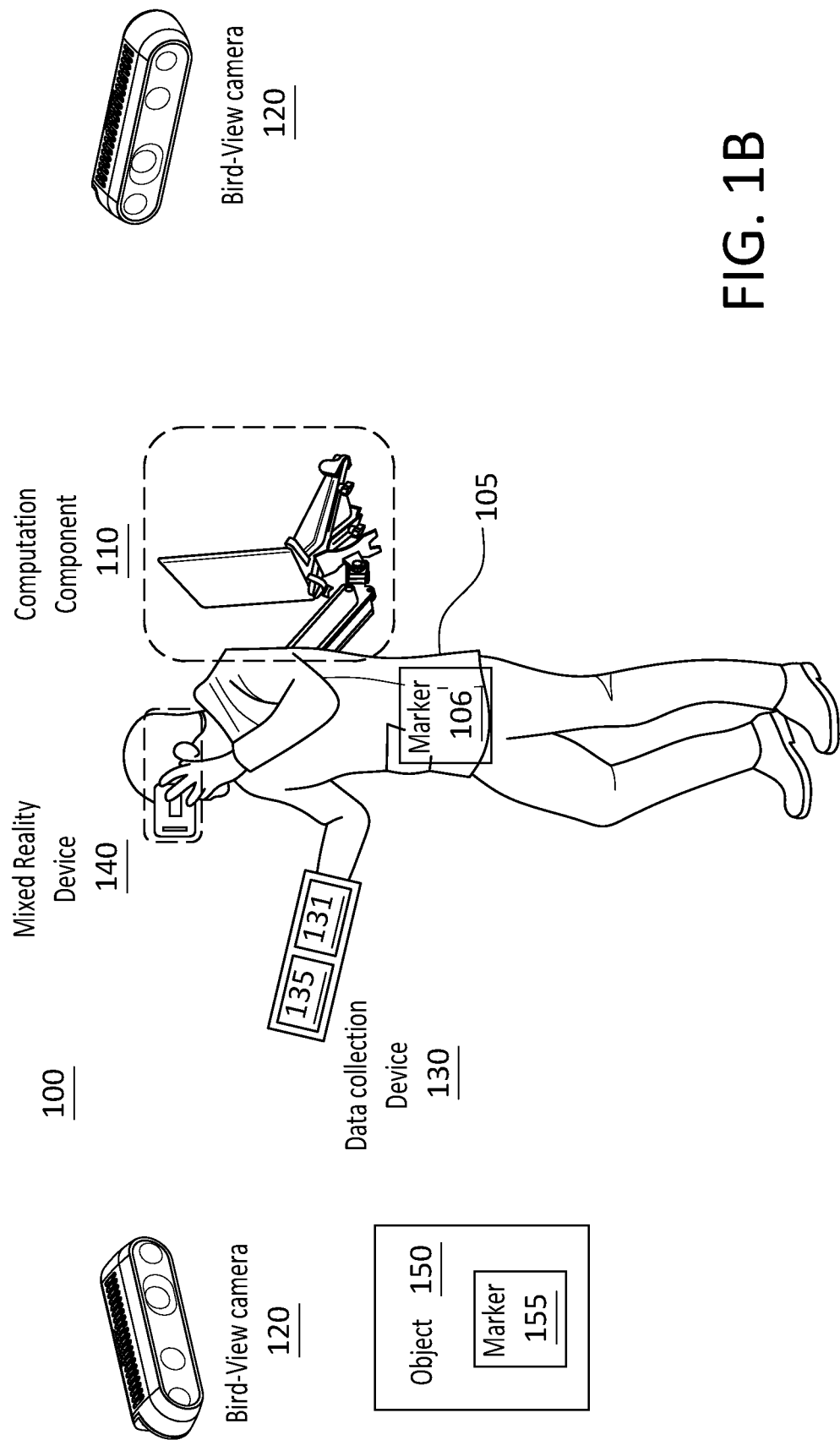

The drawing figures are not necessarily drawn to scale. Instead, they are drawn to provide a better understanding of the components thereof, and are not intended to be limiting in scope, but to provide exemplary illustrations.

DETAILED DESCRIPTION

A better understanding of the disclosure's different embodiments may be had from the following description read with the drawings in which like reference characters refer to like elements. While the disclosure is susceptible to various modifications and alternative constructions, certain illustrative embodiments are shown in the drawings and are described below. It should be understood, however, there is no intention to limit the disclosure to the specific embodiments disclosed, but on the contrary, the aim is to cover all modifications, alternative constructions, combinations, and equivalents falling within the spirit and scope of the disclosure.

The references used are provided merely for convenience and hence do not define the sphere of protection or the embodiments. It will be understood that unless a term is expressly defined in this application to possess a described meaning, there is no intent to limit the meaning of such term, either expressly or indirectly, beyond its plain or ordinary meaning. Any element in a claim that does not explicitly state "means for" performing a specified function or "step for" performing a specific function is not to be interpreted as a "means" or "step" clause as specified in 35 U.S.C. § 112.

FIGS. 1A-1E illustrate an example embodiment of a testing and/or training system 100 for testing and/or training a robot control module that includes machine-learning models and other software for control of robotic systems. As illustrated, the testing and/or training system 100 includes various elements that are used in the testing and/or training of the robot control module. For example, the testing and/or training system 100 includes a computation device 110 that includes a storage device 115 and a robot control module 125, visual sensing devices 120 including birds view cameras, a data collection device 130, and a mixed reality device 140.

In the embodiments, a human data collector 105 wears at least some of the elements of the testing and/or training system 100 while collecting the data that will be used to train and/or test the robot control module 125 that hosts one or more machine learning (ML) models 126 and/or other robot control software 127 such as look-up tables, libraries, and/or robot control algorithms as will be explained in more detail to follow. Thus, the robot control module 125 includes any combination of ML models and other types of robot control software. The wearability of at least some of the elements of the testing and/or training system 100 allows the human data collector 105 to mimic actual robot action or movement and this can then be recorded and used as data for future robot learning.

As illustrated, the testing and/or training system 100 includes the computation device 110, which in the embodiments may comprise any reasonable computing system. As illustrated, the computation device 110 is mounted onto a frame and arm so as to allow the human data collector 105 to wear the computation device 110. Advantageously, this allows the computation device 110 to be mounted onto the back of the human data collector 105 so as to not impede the mobility of the data collector when performing the testing and/or training robot control tasks. In some embodiments, the computation device 110 may be worn by the human data collector 105 in a backpack or similar unit instead of the frame and arm unit. Thus, the embodiments disclosed herein are not limited by the way manner that the human data collector 105 wears the computation device 110.

In other embodiments, the computation device 110 may be a computing system that is not worn by the human data collector 105, but that is accessible by the human data collector 105 and the other elements of the testing and/or training system 100. In further embodiments, the computation device 110 may be a distributed computing system including both a worn computation device and a non-worn computation device.

As also illustrated, the computation device also includes a storage device 115, which is configured to store data that is collected by the visual sensing devices 120, the data collection device 130, and/or other devices. In some embodiments, the storage device 115 can be a separate machine from the computation device 110.

In some embodiments, the computation device 110 has at least the following four functions: 1) real-time synchronization of multiple data resources, 2) data processing, 3) creating data visualization, and 4) communication with the other elements of the system. The computation device 110 provides timestamps for incoming data. The timestamps are useful for future time synchronization. The computation device 110 is configured to perform necessary and simple data processing, such as resampling, resizing images, and pose estimation. The processed data is then transferred to the storage device 115. The computation device 110 is also configured to perform simple graphic plotting for real time data visualization. The computation device 110 provides important information, e.g., pose estimation, target selection, instructions for the mixed reality device 140 to respond to the human data collector 105. In addition, the computation device 110 also receives and puts timestamps of the data collector's commands, feedback, and annotations and then transfers this data to the storage device 115.

As illustrated, the computation device 110 includes the robot control module 125 that may include one or more ML models 126, which may be any reasonable machine learning model related to robot control. In operation, the ML models 126 are the models, such as computer vision models, robot control models, and other relevant model that are trained by the performance of the various robot control actions or tasks by the human data collector 105. Data is collected from the visual sensing devices 120 and/or the data collection device 130 and is then provided to the computation device 110. The processing resources of the computation device 110 then use the collected data to train the ML models 126. Many different ML models 126 may be implemented, including supervised and non-supervised training, e.g., (but not limited to) logistic regression, isolation forest, k-nearest neighbors, support vector machines (SVM), deep learning, and reinforcement learning. It will be appreciated that the training of the ML models 126 need not happen in real time when the data is collected from the visual sensing devices 120 and the data collection device 130. Rather, the data may be collected, stored in the storage device 115, and then used by the resources of the computation device 110 to train the ML models 126 at a later time.

Alternatively, or in addition to, in some embodiments the ML models 126 may have been previously at least initially trained by data that was previously collected and stored in the storage device 115. In such embodiments, the ML models 126, the other software 127, or a combination of both, may be tested as the human data collector 105 performs various robot control tasks using the data collection device 130 as directed by the robot control module 125. In this way, it is possible to determine if the earlier training is correct and it is also possible to continually update the training of the model to achieve better results.

As illustrated, the testing and/or training system 100 includes the visual sensing devices 120. The visual sensing devices 120 includes cameras for collecting raw sensing camera data. The cameras include depth cameras, tracking cameras, RGB cameras, bird view cameras located at fixed locations in the location where the training and/or testing occurs. In one embodiment, one or more bird-view cameras are implemented in a fixed location on a wall or ceiling of the location where the training and/or testing process is occurring. The one or more bird-view cameras can be a depth camera such as an Intel D435 camera. In operation, the one or more bird-view cameras may provide the raw sensing camera data to the computation device 110. It will be appreciated that the embodiments disclosed herein are not limited to any specific number or type of camera that is included as the visual sensing devices 120.

In operation, the various cameras included as the visual sensing devices 120 provide raw sensing data to the computation device 110. The raw sensing camera data may include position (RGB and depth) data of the data collection device 130 when the human data collector 105 moves the data collection device 130 while performing one or more robot control tasks related to training and/or testing the machine learning models 126 and/or other software 127. This data may be collected as video data and collected on a frame-by-frame basis.

The raw sensing camera data may also include pose data that tracks a pose of the data collection device 130 while performing one or more robot control tasks related to training and/or testing the machine learning models 126. The pose data may include the pose of the data collection device 130 in 3D space including X,Y,Z coordinates and their related angles. The raw sensing camera data may also include the position and the pose of the human data collector 105. In addition, the raw sensing camera data may include the pose and position of an object 150 that the human data collector 105 is interacting with by use of the data collection device 130.

In some embodiments, the position and pose of the human data collector 105, the data collection device 130, and/or the object 150 may be determined using various optical markers, such as QR markers and ArUco markers, that are attached to these elements. For example, the human data collector 105 may have an optical marker 106 attached to his or her body, the data collection device 130 may have an optical marker 135 attached to it, and the object 150 may have an optical marker 155 attached to it. The cameras of the visual sensing device 120 may use the optical markers 106, 135, and/or 155 to determine the pose and location of the data collector, data collection device and/or the object.

As illustrated, the testing and/or training system 100 includes the data collection device 130. In one embodiment, the data collection device 130 is a wearable human-machine interface, which includes various sensors 131 for data collection. The sensors 131 may include distance sensors and localization sensors that measure the movement of the data collection device 130. The sensors 131 may track the configurations, including the individual joints of data collection device 130. That is, the 3D pose of the joints of a robotic gripper or robotic hand that is part of the data collection device 130 may be tracked. Likewise, the pose of the joints of the data collector's hands may be tracked. The data that is measured by the various sensors 131 is then sent to the computation device 110. The data collection device may also include one or more cameras such as an eco-centric camera that collects visual data in a manner similar to the cameras of the visual sensing devices discussed previously.

The data collection device 130 may also measure control signals that are used to control the various operational elements of the data collection device 130. For example, the data collection device 130 may include one or more buttons, triggers, potentiometers, or other user input devices that are activated by the human data collector 105 when he or she performs the robot control tasks related to training and/or testing the machine learning models 126. The activation by the human data collector 105 may generate the control signals. In one embodiment, the control signals may be the pressure that is exerted when the button is activated. The control signals are then sent to the computation device 110.

In other embodiments, the data collection device 130 also includes various cameras that are included on the data collection device 130. In one embodiment, the various cameras include at least one depth camera such as an Intel D435 that is mounted on a top surface of the data collection device 130 and at least one tracking camera such as an Intel T265 that is mounted on a bottom side of the data collection device 130. In operation, the one or more cameras may provide the raw sensing camera data to the computation device 110. Further detail about the data collection device 130 is included in the appendix that follows this application.

Figure 1C:
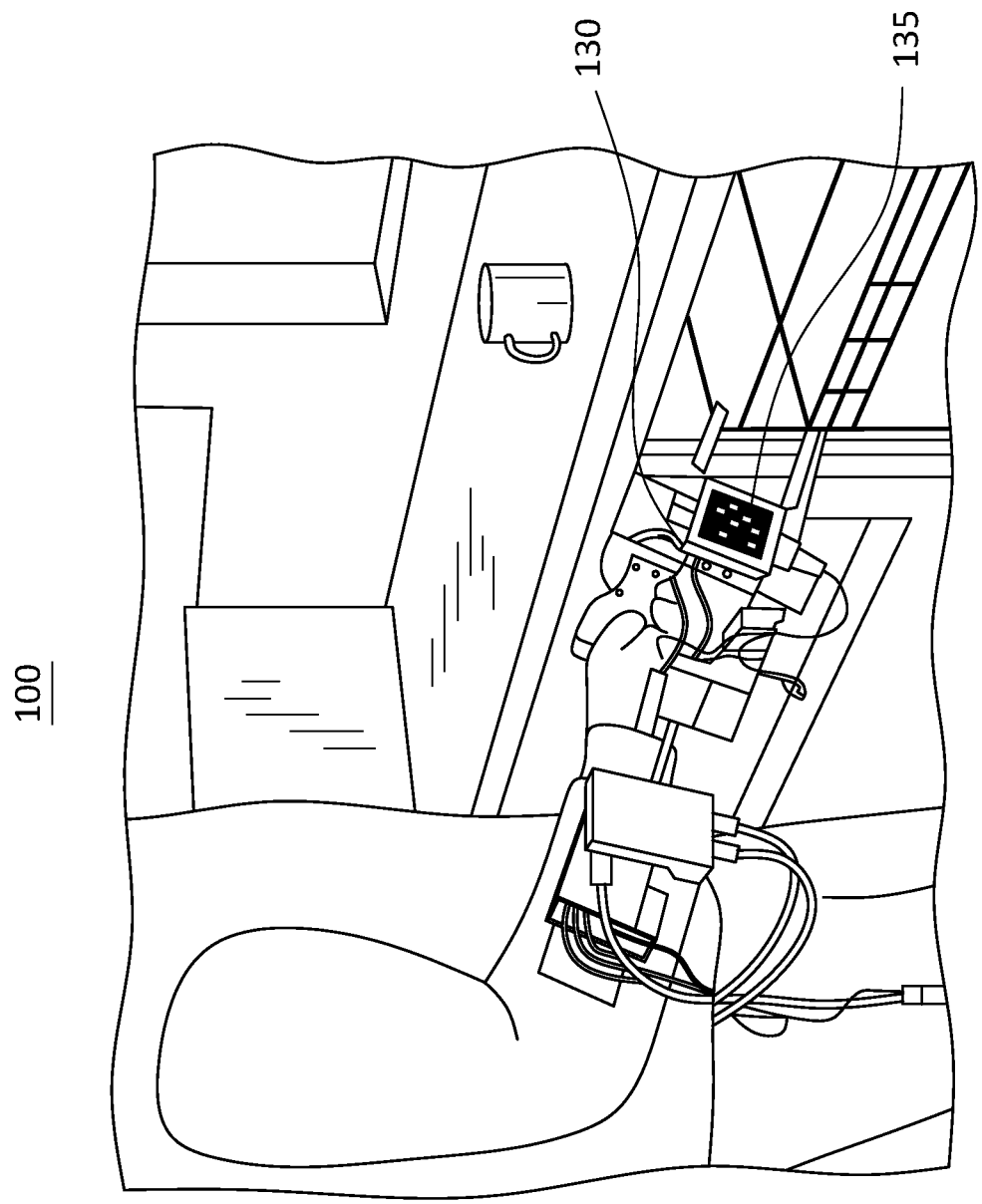

FIG. 1C illustrates a specific embodiment of the data collection device 130 and the optical marker 135. As illustrated in the figure, the optical marker 135 is attached to the data collection device 130. The cameras of the visual sensing device 120 are then able to track the optical marker 135 so that the collected data can be used to determine the pose and location of the data collection device 130.

Figure 1D:
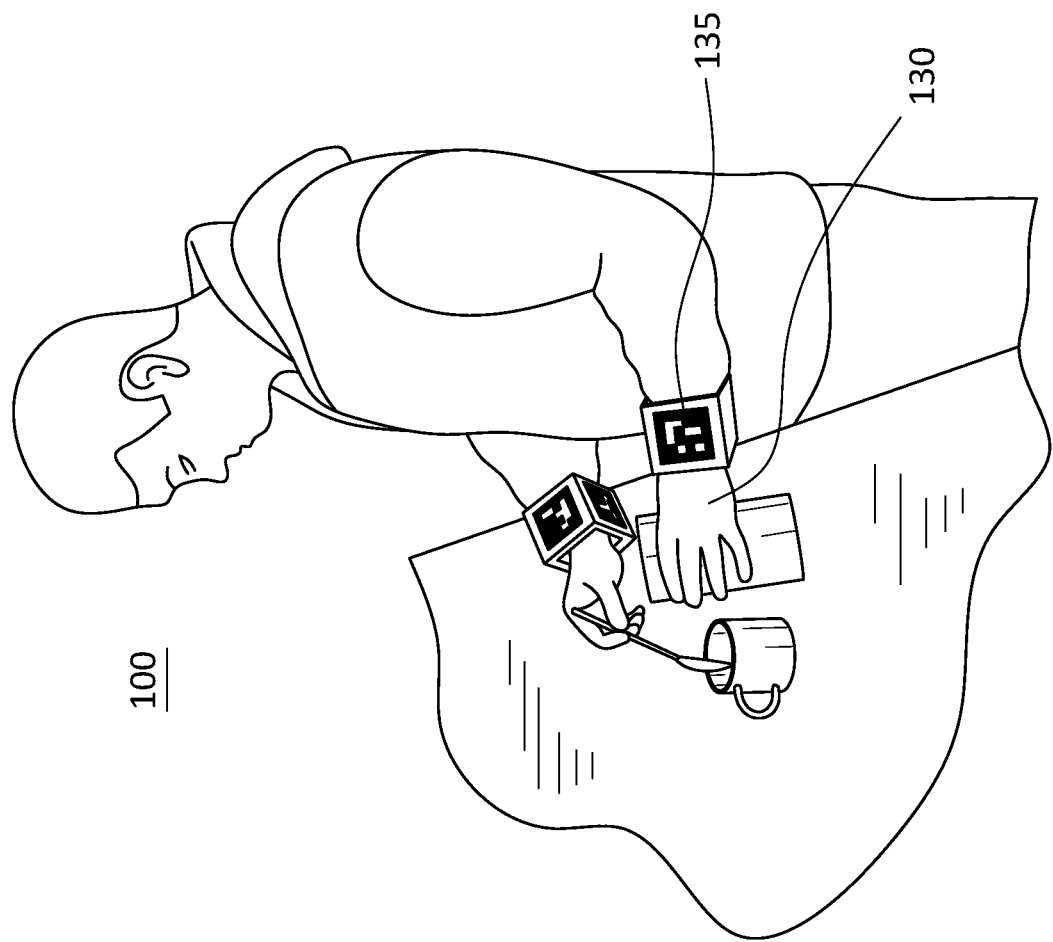

FIG. 1D illustrates an embodiment of when the human data collector 105's hands/and or arms are considered the data collection device 130. In this embodiment, the optical marker 135 is attached to the data collector's forearm. The cameras of the visual sensing devices 120 are then able to track the optical marker 135 so that the collected data can be used to determine the pose and location of the data collector's hands and/or arms.

As illustrated, the testing and/or training system 100 also includes the mixed reality device 140, which may be a virtual reality/augmented reality (VR/AR) device or other human usable interface such as a screen a human can view or a voice interface that can receive audio messages from. In embodiments, the mixed reality device 140 is a platform that the human data collector 105 can use to communicate with the other elements of the testing and/or training system 100. The mixed reality device 140 is a bidirectional interface. On one side the mixed reality device 140 delivers the sound and visual information including instructions, confirmations, and previews from the other elements of the system 100 to the human data collector 105. In some embodiments, the mixed reality device 140 may show camera previews, data curves, and visual demos/instructions or voice prompts. On the other side, the mixed reality device 140 collects comments, feedback, and commands from the human data collector 105. The mixed reality device 140 may involve a voice user interface to listen to the data collector's commands or a motion command interface including hardware input devices like buttons, a keyboard, or a mouse. The mixed reality device 140 may be implemented as mixed reality glasses that can be used to provide instructions to the human data collector 105.

In operation, the mixed reality device 140 receives robot control instructions that specify human-driven robot tasks from the computation device 110 and renders the instructions that show the human data collector 105 how to perform a human-driven robot task. For example, in one embodiment the mixed reality device 140 renders the instructions as an audio or voice instruction that allows the human data collector 105 to hear voice instructions from the computation device 110. The voice instructions may audibly instruct the human data collector 105 to pick up the object with the data collection device 130 and then to move the object 150 so that the data related to this movement can be collected.

In some embodiments, the mixed reality device 140 renders the robot control instructions as data visualization instructions that show the human data collector 105 how to perform the human driven robot tasks. That is, the visual instructions are rendered by the mixed reality device 140 based on the robot control instructions received from the computation device 110 so as to be viewable by the human data collector 105 in either a text, word, or natural language form or in a visual, graphical, or picture form how to perform the human driven robot tasks. The visual, graphical, or picture form may include a visual marker in 3D space that shows the human data collector 105 how to perform a human-driven robot task such as moving or picking up an object when moving or picking up the object is the human driven robot task. The visual, graphical, or picture form may include a visual path in 3D space displayed on the mixed reality device as will be explained in more detail in relation to FIGS. 3A-3C.

Figure 1E:
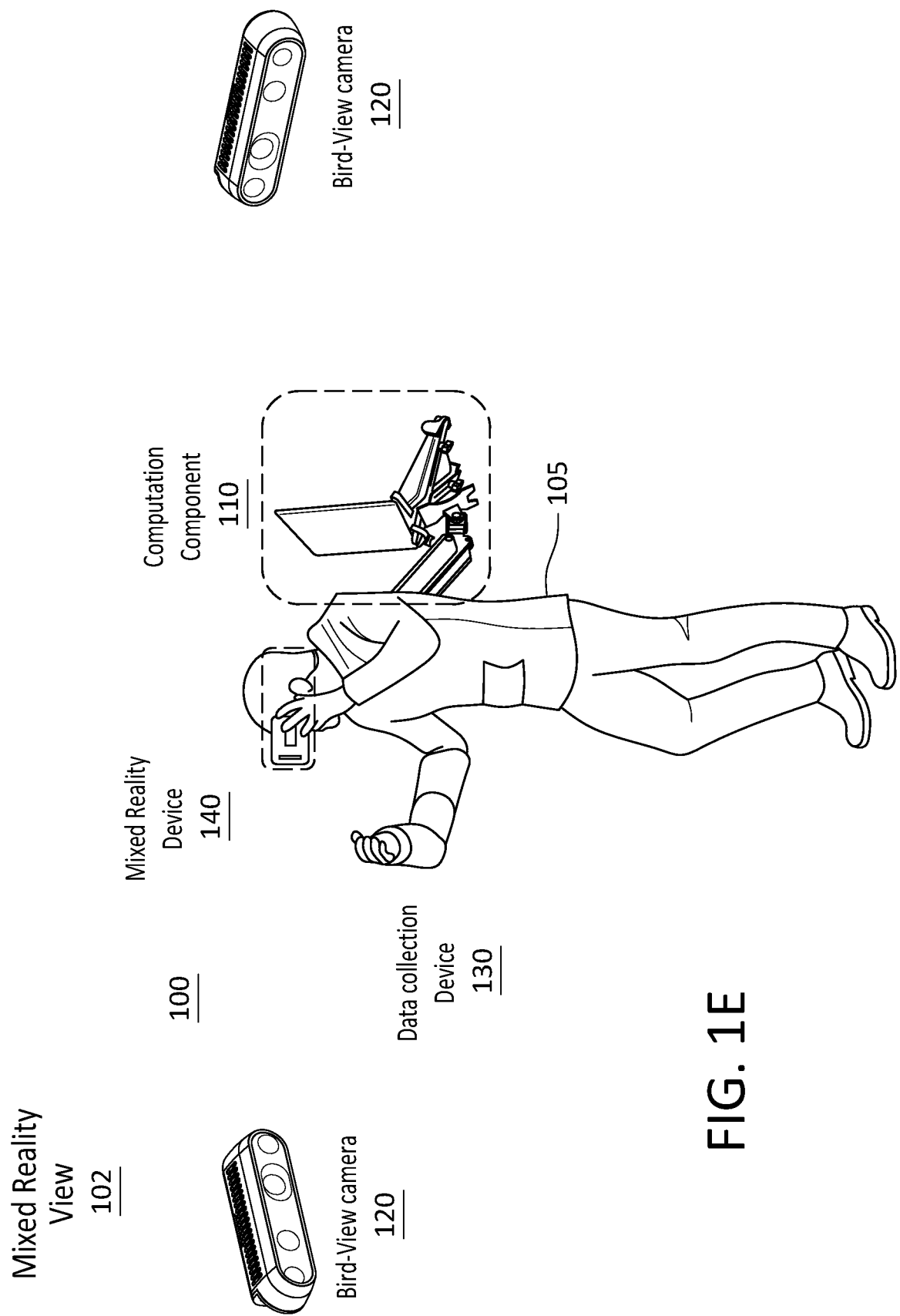

In some embodiments as shown in FIG. 1E, the mixed reality device 140 may generate a mixed reality view 102 that renders the portion of the data collection device 130 seen by the human data collector 105 as a robotic arm. That is, a robotic arm would be superimposed onto the portion of the data collection device 130 seen by the human data collector 105. In some embodiments, the mixed reality device 140 may superimpose the entire robot over all portions of the human data collector 105 that are seen by the data collector. Superimposing the robotic arm or the entire robot helps the human data collector 105 to visualize how a robot might move when the data collector is performing the directed robot control tasks. It will be appreciated, however, that this is different from a complete virtual reality view. That is, although the human data collector 105 may see the superimposed robot arm or body, he or she will still be performing a real task in the real world. For example, as will be explained in more detail to follow, the human data collector 105 may pick up a real cup and move the real cup to a real dishwasher machine. Thus, the fact that the robot arm or body is superimposed so that the human data collector 105 sees the robot arm or body may not be the same as a test where the data collector is directed to pick up a virtual cup and then to perform virtual movement to a virtual dishwasher machine.

Figure 2A:
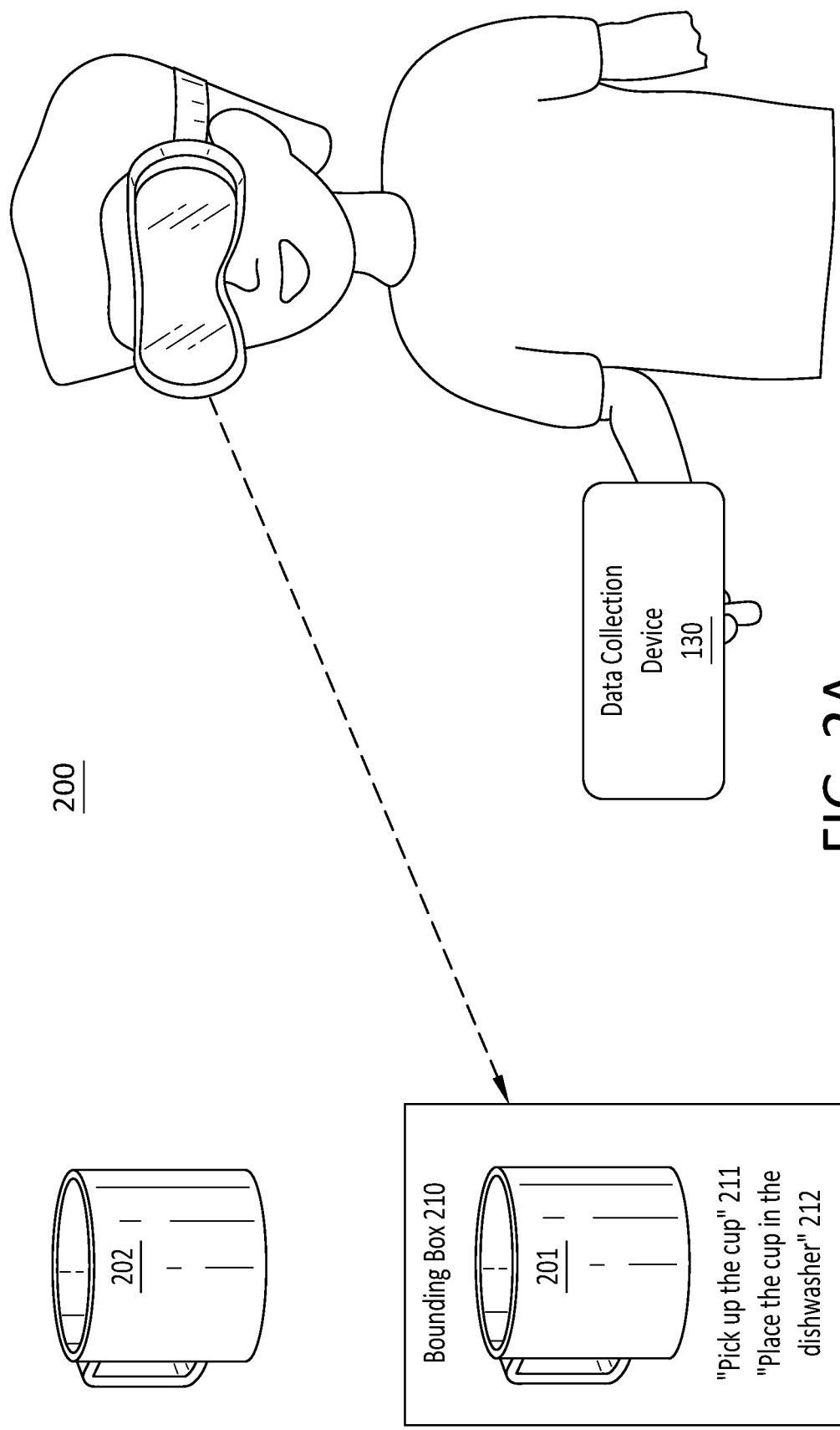
FIGS. 2A and 2B illustrate further illustrate the environment of FIGS. 1A-1D.

FIG. 2A illustrates a training or testing environment 200 including a cup 201 and a cup 202, which are examples of the object 150. In this embodiment, an instruction is rendered in the mixed reality device as a bounding box 210 that surrounds the cup 201, thus informing the human data collector 105 that he or she should pick up the cup 201 with the data collection device 130 and not the cup 202. In addition, the data visualization instructions may also include readable text instructions that can be read by the human data collector 105. As illustrated, the readable text instruction 211 may instruct the data collector to "pick up the cup" and the readable text instructions 212 may instruct the data collector to "place the cup in the dishwasher". It will be appreciated that there may be any number of readable text instructions as circumstances warrant. In some embodiments, as the human data collector 105 follows the instructions to move the cup 201 using the data collection device 130, the bounding box 210 may move with the cup so as to continually surround the cup while the cup is being moved.

In some embodiments as will be explained in further detail in FIGS. 3A-3C, a visual demonstration of how to perform the instructed human-driven robot task such as picking up and moving the cup 201 may be shown to the human data collector 105 in the mixed reality device 140. This helps ensure that the human data collector 105 will be properly trained to carry out the instructed task. Thus, instead of the textual instructions 211 and 212 or in addition to the textual instructions, the visual instructions may will be rendered in the mixed reality device 140.

Figure 2B:
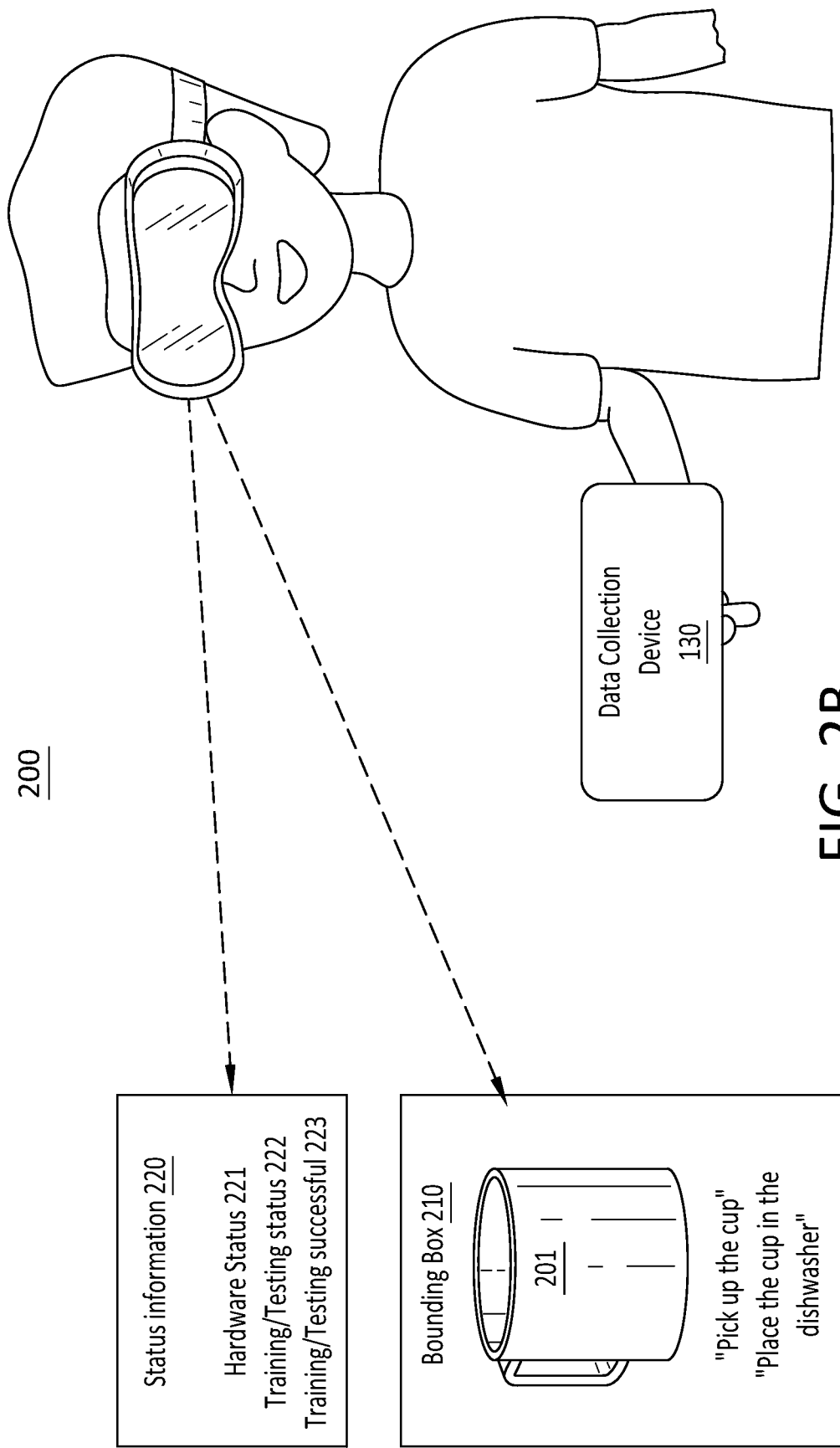

In operation, the mixed reality device 140 also allows the human data collector 105 to receive feedback from the computation device 110. For example, as shown in FIG. 2B, the human data collector 105 receives status information 220, which is a type of feedback, about the training and/or testing process from the computation device 110. As illustrated, the status information 220 includes hardware status information 221 that provides information to the human data collector 105 about whether the hardware of the various elements of the training and/or testing system 100 are properly functioning.

The status information 220 also includes training and/or testing status information 222 which provides information to the human data collector 105 about the status of the training and/or testing process and how the process is proceeding to completion. In some embodiments, the training and/or testing status information 222 may also include prompts to the human data collector 105 when a task needs to be repeated.

The status information 220 also includes information 223 which informs the human data collector 105 that the training and/or testing process has been successfully completed. It will be appreciated that there may be any number of additional status information as circumstances warrant.

Figure 3A:
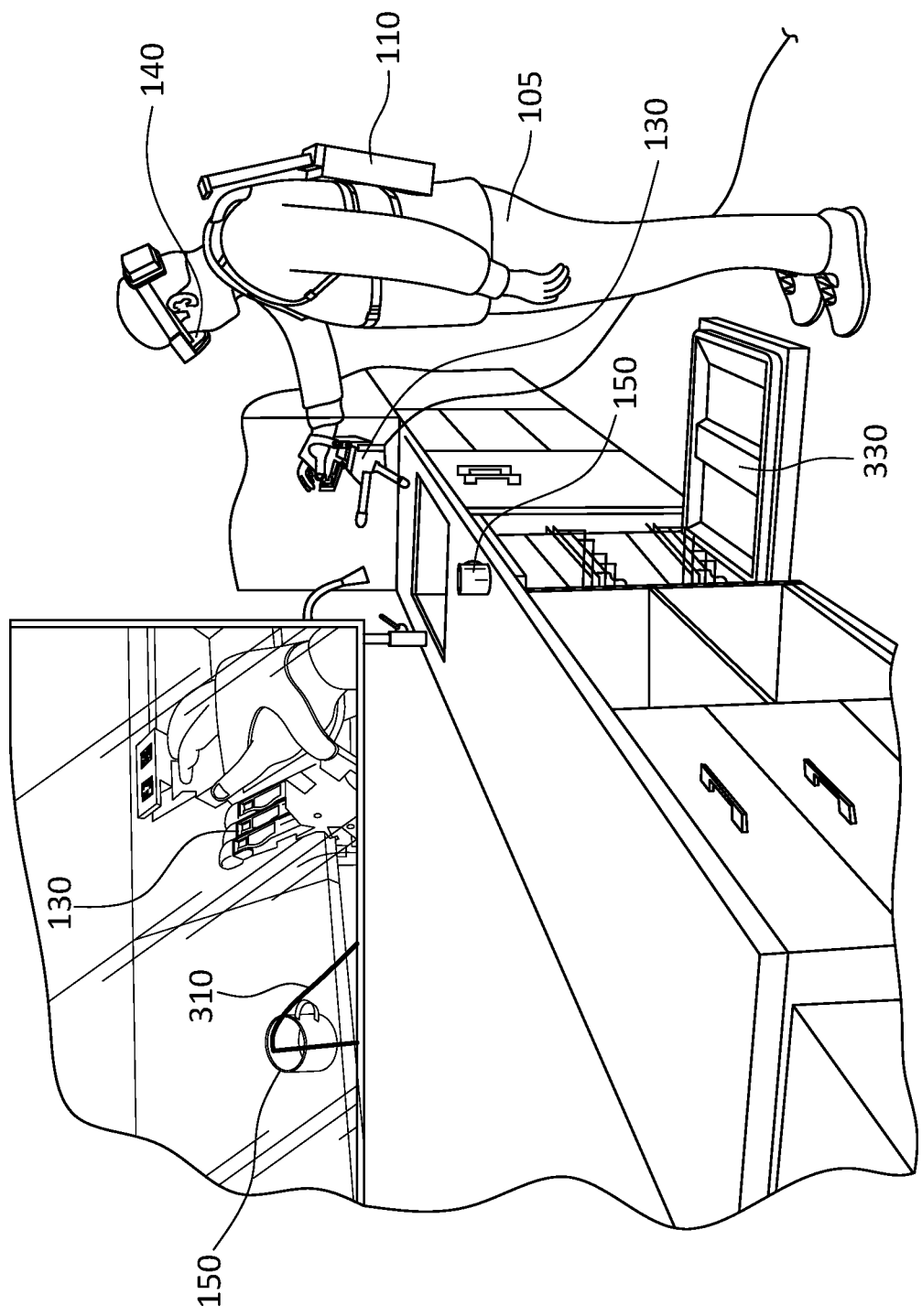
FIGS. 3A-3C illustrate an embodiment of performing a human-driven robot control task for training and/or testing machine learning models used in controlling robotic systems.
Figure 3B:
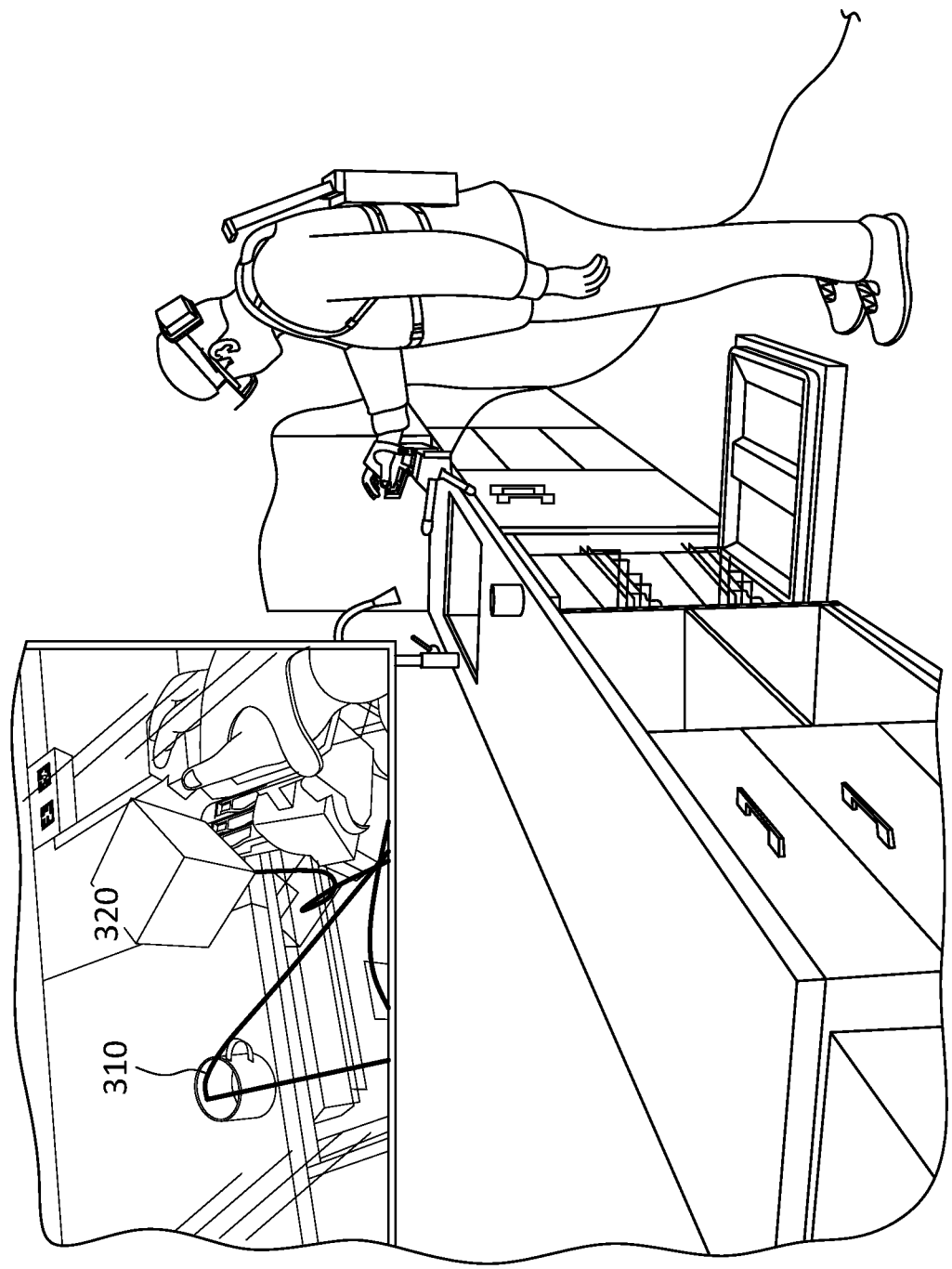
Figure 3C:
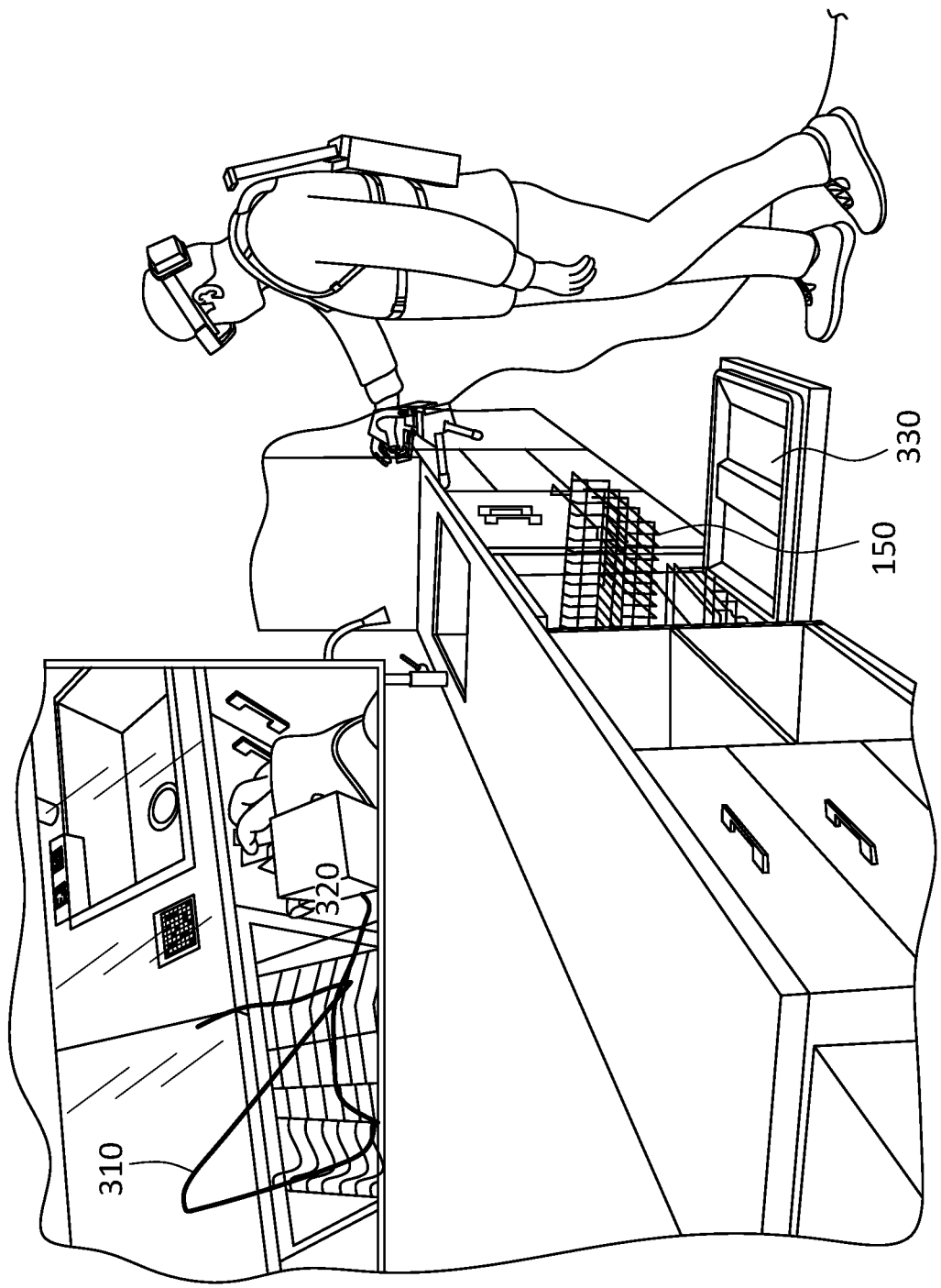

FIGS. 3A-3C illustrate an example of the operation of the mixed reality device 140 during the performance of a robot control task for testing the robot control module 125 that includes the one or more of the ML models 126 and/or the other robot control software 127 such as one or more control algorithms. As shown in FIG. 3A, the task to be performed by the human data collector 105 is moving an object 150, which in the embodiment is a cup, to a dishwasher machine. As illustrated, in the embodiment the human data collector 105 is wearing the computation device 110 using a backpack to hold the computation device. The human data collector 105 is also wearing the data collection device 130, which in the embodiment is a human-machine interface and is wearing the mixed reality device 140.

The upper left of FIG. 3A shows an example embodiment of what is seen by the human data collector 105 through the mixed reality device 140. As shown, the human data collector 105 sees the object or cup 150 along with a portion of the data collection device 130. In addition, the mixed reality device 140 renders a visualization instruction that shows the human data collector 105 a visual path 310, which is an example of a visual marker, to take to pick up the cup 150 and move the cup to the dishwasher machine 330. As previously explained, the visualization instruction is generated by the computation device 110 based on the robot control module 125 that is being tested. That is, for a robot control module that is being tested, the visualization instruction may show the path 310 where data collection is desired. In such embodiments, the human data collector 105 is able to collect data that would help to show if a robot would be able to follow the visualized path 310 when doing the directed human-driven robot task.

FIG. 3B shows a further view of the visualization instruction of the visualized path 310 that the human data collector 105 will follow to pick up the cup 150 and move it to the dishwasher machine 330. FIG. 3B shows that in some embodiments another visual marker 320 may also be provided to show the data collector 105 how to perform the human-driven robot task. That is, the visual marker 320 may show the human data collector 105 how high to pick up the cup 150 when initially picking up the cup.

FIG. 3C shows the that the visual marker 320 has moved to a location further along the path 310 to show the human data collector 105 how to move the cup to the dishwasher machine 330. FIG. 3C also shows that the data collector has successfully moved the cup 150 from the counter to the dishwasher machine 330. This process may be repeated as often as needed to collect sufficient data to test the robot control module 125 including the machine learning model 126 and other robot control software 127.

In some embodiments, since the visualized path 310 is a visual marker, the visualized path 310 will show an overall robot control mission. For example, the overall robot control mission may be to move the cup from the counter to the dishwasher machine 330. Thus, the human data collector 105 would be able to follow the visualized path 310 to determine if the overall robot control mission is able to be completed.

In other embodiments, the visualized path 310 is created based on related human-driven robot tasks. For example, the human-driven robot task could be to pick up the cup 150 and the visual marker 320 could be rendered by the mixed reality device to show how high to pick up the cup. The next human-driven robot task could be to move the cup to the dishwasher machine 330 and the visual marker 320 could be rendered by the mixed reality device to show how to move the cup, after it has been picked up, to the dishwasher machine 330.

In some embodiments, the mixed reality device may add to the visualized path 310 as each human-driven robot task is rendered. For example, a first portion of the visualized path 310 may be rendered when the visual marker 320 is rendered to show how to pick up the cup. A second portion of the visualized path 310 may then be added to the visualized path 310 when the visual marker 330 is rendered to show how to move the cup, after it has been picked up, to the dishwasher machine 330. In such embodiments, the entire visualized path 310 would be rendered in the mixed reality device at the completion of the related human-driven robot tasks as is shown in FIG. 3C.

Thus, the human data collector 105 is able to collect data that tests whether the proposed path 310 is able to be completed. For example, if the proposed path 310 causes the data collector to hit a wall or to drop the cup when attempting to move the cup 150 to the dishwasher machine 330, then the robot control module 125 can learn that this path will not work. For example, it is possible that the data collection device 130 that is being used is too large and so therefore the wall is hit, or the cup is dropped. Alternatively, the data collection device 130 may not be configured to handle the weight of the cup 150 or the robotic hand or robotic gripper of the data collection device 130 is too large to pick up the cup and so therefore the wall is hit, or the cup is dropped. Further, it is possible that the proposed path is simply too close to the wall. In any event, the data collection device 130, the machine learning model 126 and/or the other software 127 can be updated and/or changed so as to generate a new proposed path that would not hit the wall.

Figure 4:
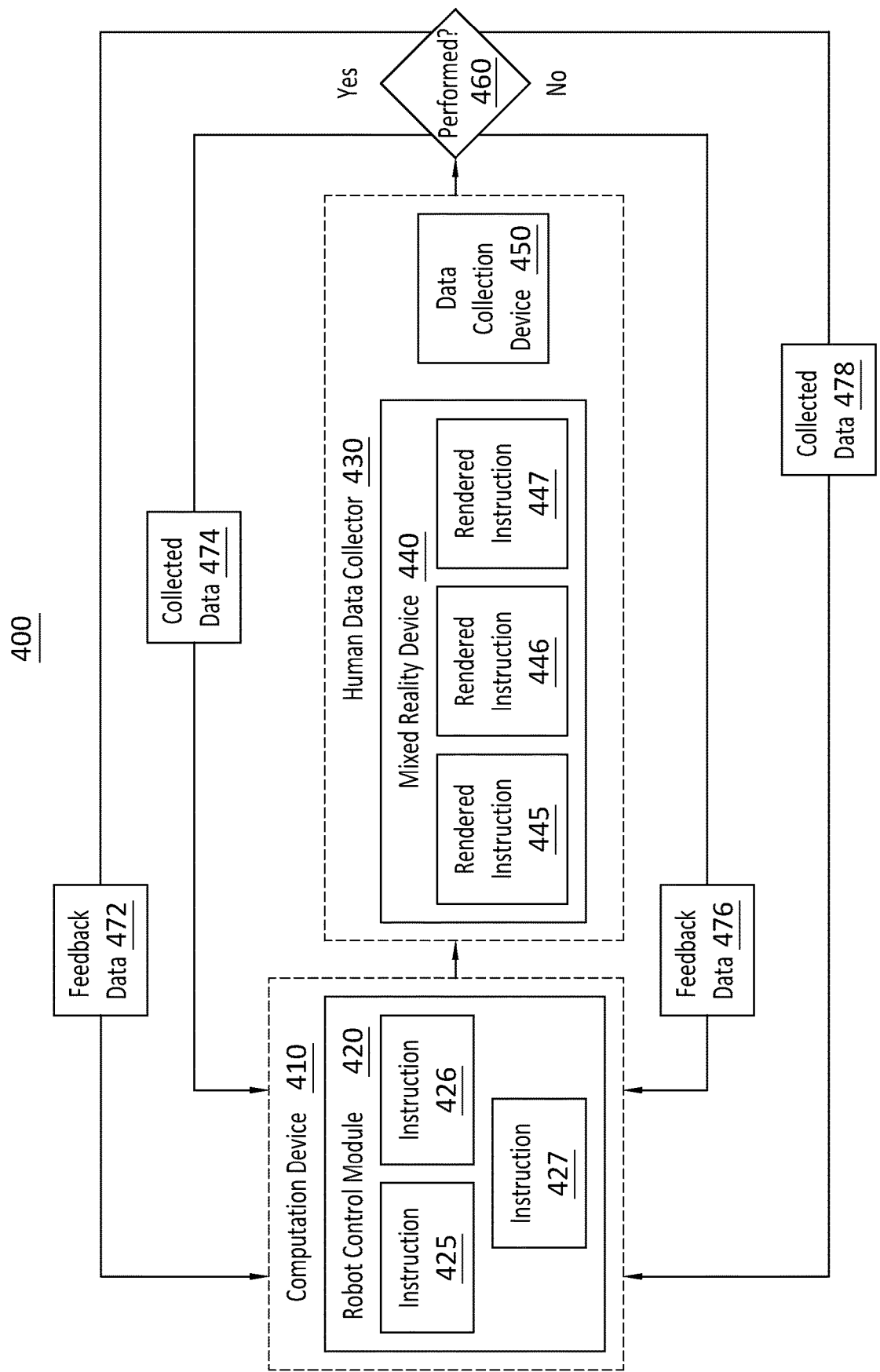
FIG. 4 illustrates a process of performing a human-driven robot control task for training and/or testing machine learning models used in controlling robotic systems.

FIG. 4 illustrates an embodiment of an environment 400 for training and/or testing a robot control module. As illustrated, the environment 400 includes a computation device 410, which may correspond to the computation device 110. The computation device hosts a robot control module 420, which may correspond to the robot control module 125. Thus, as discussed above, the robot control module 126 may include one or more ML models 126 and/or the other robot control software 127 such as look-up tables, libraries, and/or robot control algorithms.

A robot control instruction 425 is generated based on the robot control module 420. The robot control instruction 425 indicates how a human-driven robot task, such as those tasks previously described in relation to FIGS. 2A-2B and 3A-3C, is to be performed when training or testing the robot control module 420. For example, the robot control instruction 425 may indicate that the human data collector 430 pick up a cup. In some embodiments, a list of robot control instructions related to a series of related human-driven robot tasks for an overall robot control mission is generated for the human data collector 430 to perform. In such embodiments, the robot control instruction 425 could be considered a first robot control instruction, a subsequent robot control instruction could be considered a second robot control instruction, and so on.

The robot control instruction 425 is provided to a mixed reality device 440, which may correspond to the mixed reality device 140, that is worn by the human data collector 430, who may correspond to the human data collector 105. The mixed reality device 440 renders the robot control instruction 425 instruction 425 into a rendered instruction 445 that shows the human data collector 430 how to perform the human-driven robot task. As discussed previously in relation to FIGS. 2A-2B, the rendered instruction 445 is able to show the human data collector 430 how to perform the human-driven robot task because the rendered instruction 445 is rendered to be a readable text instruction (e.g., instructions 211 and 212) that specifies how to perform the human-driven robot task specified by the robot control instruction 425, rendering a bounding box (e.g., bounding box 210) that visually identifies an object to be interacted with, rendering a visual path (e.g., path 310) that visually indicates how the human-driven robot task specified by the robot control instruction 425 is to be performed, rendering a maker that shows how an object is to be moved, or rendering audio instructions that the human data collector 430 hears.

The human data collector 430 will then attempt to perform the human-driven robot task indicated by the robot control instruction 425 using a data collection device 450, that may correspond to the data collection device 130. Suppose that the rendered instruction 445 is a visual instruction that includes a visual path 310 and/or visual marker 320 that shows the human data collector 430 how to pick up the 201. Accordingly, the human data collector 430 would attempt to pick up the cup 201 using the data collection device 450.

If the human data collector 430 is successful in performing the human-driven robot task, that is in picking up the cup 201 (Yes in decision block 460), the human data collector 430 will provide feedback data 472 to the computation device 410 and the robot control module 420 that the cup is successfully picked up. In some embodiments, the feedback data 472 (and all the other feedback data discussed in relation to FIG. 4) may be provided the computation device 410 and the robot control module 420 in real time. The feedback data 472 may be data that is marked by the human data collector 430 to indicate that the human data collector 430 is successful in performing the human-driven robot task. The data may be marked by the human data collector 430 by having the human data collector place a voice annotation in the feedback data 472 that indicates to the computation device 410 and the robot control module 420. Alternatively, or in addition to, the human data collector 430 may select an interface element such as a virtual button or pointer that is rendered by the mixed reality device 140 to generate an annotation in the feedback data 472 that indicates to the computation device 410 and the robot control module 420 that the cup was successfully picked up. The feedback data 472 is then used to retrain or otherwise update the robot control module 420. The update of the robot control module 420 may occur in real-time or it may occur at a time after the feedback data 472 is received.

In addition to the feedback data 472, performance data and environmental data are also collected. This is referred to as collected data 474 in FIG. 4. The collected performance data is data that is related to the performance of the human-driven robot task. For example, when the human-driven robot task is to pick up the cup 201, the collected performance data would be data related to all the actions that the human data collector 430 performed, such as gripping the cup and lifting the cup, that are related to picking up the cup. The collected performance data may be collected by the data collection device 450 and/or one or more visual sensing devices such as the visual sensing devices 120.

The collected environmental data is all other data that is collected besides the collected performance data. For example, the collected environmental data may be data that is related to the layout of the area where the testing is being performed and thus will include data about walls or other obstructions that impede the performance of the human-driven robot task. The collected environmental data includes other relevant data that can be collected and used to update the robot control module 420.

Thus, in the embodiment, the collected data 474 includes sensor data collected from one or more sensors associated with the data collection device 450 and/or camera data from one or more cameras associated with the data collection device 450 when the cup 201 is successfully picked up (i.e., the human-driven robot task is successfully performed). In addition, the collected data 474 includes raw visual data collected from one or more visual sensing devices such as the visual sensing devices 120 that are located in a location of the human data collector 430. The collected raw visual data and collected sensor data and camera data may then be synchronized into a data set that is used to retrain or otherwise update the robot control module 420. In some embodiments, the feedback data 472 may be automatically annotated as being successfully performed by use of the sensor data, camera data, the raw visual data, and/or by the synchronized data that is included in the collected data 474. In still further embodiments, the feedback data 472 may include a combination of data that has been marked by human data collector 430 and the sensor data, camera data, the raw visual data, and/or by the synchronized data.

In response to receiving the feedback data 472 and the collected data 474 that indicates that the human-driven robot task was successfully performed (i.e., the cup 201 was successfully picked up), a robot control instruction 426 is generated based on the module 420. The robot control instruction 426 indicates how a different human-driven robot task is to be performed. In particular, in this embodiment the robot control instruction 426 provides the human data collector 430 with a human-driven robot task that follows the task specified by the previous human-driven robot task. For example, the robot control instruction 426 may specify that the human data collector 430 "place the cup in the dishwasher" since that task follows picking up the cup.

The robot control instruction 426 is provided to the mixed reality device 440. The mixed reality device 440 renders the robot control instruction 426 into a rendered instruction 446 that shows the human data collector 430 how to perform the human-driven robot task. The robot control instruction 426 is rendered able to show the human data collector 430 how to perform the human-driven robot task in the manner described previously for robot control instruction 425.

The human data collector 430 will then attempt to perform the human-driven robot task indicated by the robot control instruction 426 using the data collection device 450. Suppose that the rendered instruction 446 is a visual instruction that includes a visual path 310 and/or visual marker 320 that shows the human data collector 430 how to place the cup in the dishwasher. Accordingly, the human data collector 430 would attempt to place the cup 201 in the dishwasher using the data collection device 450.

If the cup 201 is successfully moved to the dishwasher, then the human data collector 430 will provide feedback data 472 that has been marked to indicate successful completion of the human-driven robot task to the computation device 410 and the robot control module 420 for use in retraining or updating the robot control module 420. Collected data 474 that includes the sensor data, camera data and/or raw visual data as discussed previously may also be provided to the computation device 410 and the robot control module 420 for use in retraining or updating the robot control module 420.

If the human data collector 430 is unsuccessful in performing the human-driven robot task indicated by the robot control instruction 425, that is in picking up the cup 201 (No in decision block 460), the human data collector 430 will provide feedback data 476 to the computation device 410 and the robot control module 420. As mentioned previously, the feedback data 476 may be marked in the manner discussed previously for feedback data 472 to indicate to the computation device 410 and the robot control module 420 that the cup 201 was not picked up. The feedback data 476 is then used to retrain or update the robot control module 420. In addition to the feedback data 476, performance data and environmental data are also collected. This is referred to as collected data 478 in FIG. 4 and the collected performance data and collected environmental data of collected data 478 corresponds to the collected performance data and collected environmental data of collected data 474. The collected data 478 may include the sensor data, the camera data, and raw visual data as discussed previously for collected data 474.

In response to receiving the feedback data 476 and the collected data 478 that indicates that the human-driven robot task specified by the robot control instruction 425 was not successfully performed (i.e., the cup 201 was not picked up), a robot control instruction 427 is generated based on the module 420. In particular, in this embodiment the robot control instruction 427 is provided in response to the human data collector 430 being unable to perform the human-driven robot task indicated by the robot control instruction 425. The robot control instruction 427 specifies a human-driven robot task for a human data collector 430 to perform in place of the unsuccessful human-driven robot task specified by the robot control instruction 425. For example, in this embodiment suppose that an obstruction such as a wall prevented the human data collector 430 from being able to pick up the cup 201 and this was indicated in the feedback data 476 and the collected data 478. In such embodiment, the robot control instruction 427 may indicate that the human data collector 430 move the cup either to the right or to the left before trying to pick up the cup to avoid the obstruction. This is an example of the robot control instruction changing because of feedback data and collected data, which may include the sensor, camera, and raw visual data, indicated something in the environment (i.e., the obstruction) has prevented the completion of the human-driven robot task. Thus, the robot control instruction is able to be changed based on sensed data and environmental conditions.

The robot control instruction 427 is provided to the mixed reality device 440. The mixed reality device 440 renders the robot control instruction 427 into a rendered instruction 447 that shows the human data collector 430 how to perform the human-driven robot task. The robot control instruction 427 is rendered able to show the human data collector 430 how to perform the human-driven robot task in the manner described previously for robot control instruction 425.

The human data collector 430 will then attempt to perform the human-driven robot task indicated by the robot control instruction 427 using the data collection device 450. If the human-driven robot task specified by the robot control instruction 427 is successfully performed (Yes in decision block 460), then the human data collector 430 will provide feedback data 472 as previously described. In addition, collected data 474 may also be provided as previously described. If the human-driven robot task specified by the robot control instruction 427 is not successfully performed (No in decision block 460), then the human data collector 430 will provide feedback data 476 that has been marked to indicate that the human-driven robot task indicated by the robot control instruction 427 was unsuccessful in the manner discussed previously for feedback data 472. In addition, collected data 478 may also be provided as previously described.

The process described in FIG. 4 may be performed during a training mode and/or a testing mode. During the training mode, the robot control module 420 may not have prior data collected that can be used for controlling a robot. Thus, the robot control module 420 may simply request that various human-driven robot tasks, some which may be unrelated, be performed in order to collect needed robot control data. For example, the robot control module 420 may specify that the human data collector 430 "pick up the cup" simply to obtain robot control data for picking up a cup.

During the testing mode, the robot control module 420 will typically have an overall robot control mission that is to be tested based on a series of related human-driven robot tasks. For example, the overall robot control mission may be to move a cup from a counter to a dishwasher as discussed previously in relation to FIGS. 3A-3C. In the testing mode, the robot control module 420 will provide each of the related human-driven robot tasks one by one to the human data collector until the overall robot control mission is performed and thus successfully tested or feedback data is received indicating that the overall robot control mission is not able to be performed, in which case a new human-driven robot task may be provided as previously described that is intended to help in achieving the overall robot control mission.

The process of providing the robot control instructions to the human data collector 430 can be repeated for any number of additional robot control instructions. Thus, the computation device 410 provides one robot control instruction at a time for each human-driven robot task that is needed to train and/or test the robot control module 420. The human-driven task is then either performed or not and the results reported back to the computation device 410 and the robot control module 420 in the manner previously described. It will be appreciated that although the embodiment of FIG. 4 shows three robot control instructions and three rendered instructions, this is for illustration only. Thus, the process described in FIG. 4 may include any number of robot control instructions and rendered instructions as circumstances warrant.

The embodiments described herein provide a novel and non-obvious advantage over existing systems. For example, it is the human data collector 105 who performs the robot control tasks so as to mimic an actual robot. Thus, rather than having to use an actual robot, which can be expensive and time-consuming and can also be dangerous if the testing environment is not conducive to handling an actual robot, the human data collector 105 can mimic the control of a robot by following the robot control instructions including the visualization instructions such as path 310. This is especially beneficial in scenarios where local laws or regulations would not permit the use of an actual robot in testing.

In addition, the embodiments disclosed herein allow the human data collector 105 to perform the actual robot control tasks. As previously described, the tasks are not done virtually, but are done by the human data collector. This allows the human data collector to have control over the testing environment to ensure safety and to ensure that the tasks are completed. Further, the data that is collected is based on actual data and not merely virtual data, which can lead to better results.

Finally, because the principles described herein may be performed in the context of a computing system some introductory discussion of a computing system will be described with respect to FIG. 5. Computing systems are now increasingly taking on a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 5:
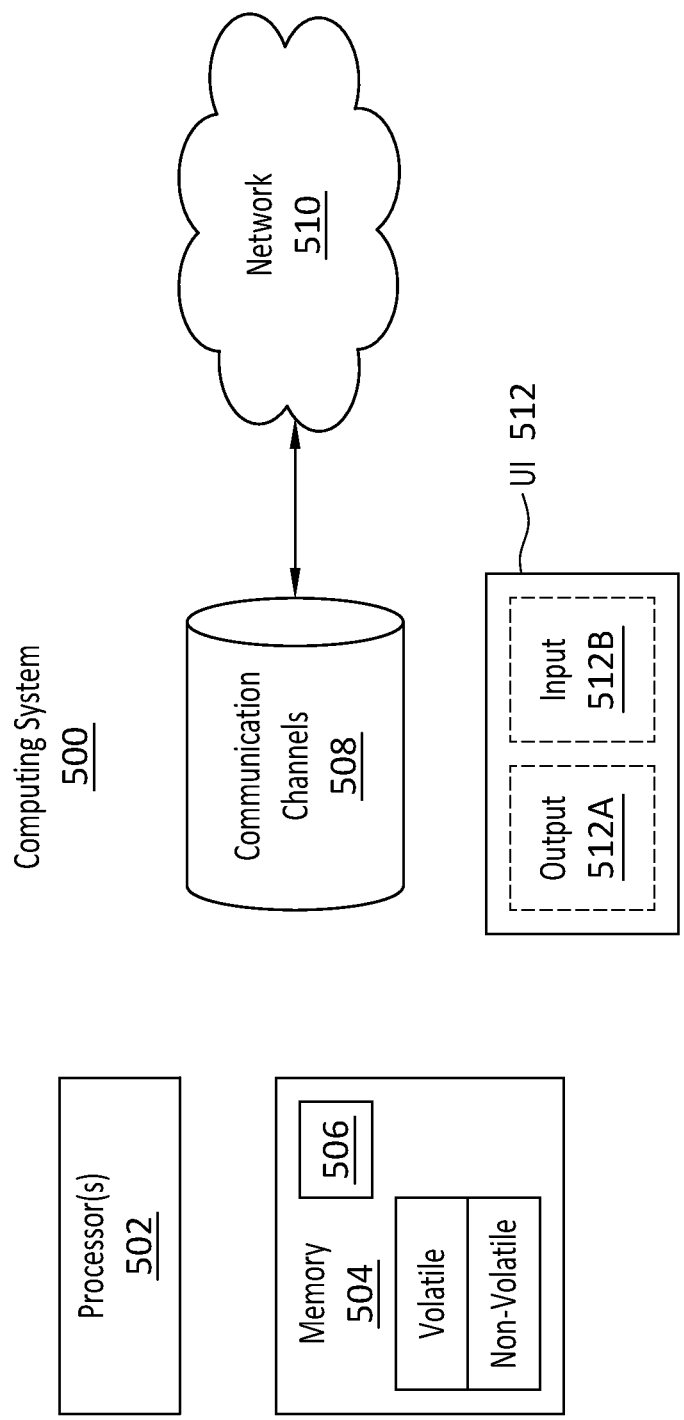
FIG. 5 illustrates a computing system that may implement the embodiments disclosed herein.

As illustrated in FIG. 5, in its most basic configuration, a computing system 500 typically includes at least one hardware processing unit 502 and memory 504. The processing unit 502 may include a general-purpose processor and may also include a field-programmable gate array (FPGA), an application-specific integrated circuit (ASIC), or any other specialized circuit. The memory 504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 500 also has thereon multiple structures often referred to as an "executable component". For instance, memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, which are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 504 of the computing system 500. Computing system 500 may also contain communication channels 508 that allow the computing system 500 to communicate with other computing systems over, for example, network 510.

While not all computing systems require a user interface, in some embodiments, the computing system 500 includes a user interface system 512 for use in interfacing with a user. The user interface system 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, holograms, and so forth. Examples of input mechanisms 512B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 500 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 502 and memory 504, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for training and/or testing a robot control module, the method comprising:
   generating at a computation device an instruction specified by a robot control module configured for robot training and/or testing, the instruction indicating how a human-driven robot task is to be performed when training and/or testing the robot control module;
   providing the instruction to a mixed reality device worn by an operator, the mixed reality device rendering the instruction in a manner that shows the operator how to perform the human-driven robot task to perform robot action or movement;
   collecting performance data and environmental data in response to the operator attempting to perform the human-driven robot task specified by the instruction using the data collection device, the collected performance data and the environmental data being collected by one or more of a data collection device and one or more sensing devices;
   receiving feedback data in response to the operator attempting to perform the human-driven robot task specified by the instruction; and
   updating the robot control module using the feedback data and the collected performance and environmental data.

2. The method of claim 1, further comprising:
   in response to receiving the feedback data and the collected performance and environmental data, generating a second instruction specified by the robot control module, the second instruction indicating how a second human-driven robot task is to performed when training and/or testing the robot control module;
   providing the second instruction to the mixed reality device worn by the operator, the mixed reality device rendering the second instruction in a manner that shows the operator how to perform the second human-driven robot task;
   collecting second performance data and environmental data in response to the operator attempting to perform the second human-driven robot task specified by the second instruction using the data collection device, the second collected performance data and the environmental data being collected by one or more of the data collection device and the one or more sensing devices;
receiving second feedback data in response to the operator attempting to perform the second human-driven robot task specified by the second instruction; and
updating the robot control module using the second feedback data and the second collected performance and environmental data.

3. The method of claim 2, wherein the second instruction is received in response to the operator being unable to perform the human-driven robot task.

4. The method of claim 2, wherein the second instruction is received when the second human-driven robot task follows the human-driven robot task.

5. The method of claim 1, wherein the feedback data includes data that has been marked by the operator to indicate if the human-driven robot task was successfully performed or not.

6. The method of claim 1, wherein the collected performance and environmental data includes data collected by the data collection device, the data collected by the data collection device including sensor data collected from one or more sensors associated with the data collection device when the first human-driven robot task is attempted to be performed.

7. The method of claim 6, wherein the collected performance and environmental data further includes raw visual data collected from the one or more visual sensing devices that are located in a location of the operator, the collected raw visual data and collected sensor data being synchronized into a data set that is used to update the robot control module.

8. The method of claim 1, wherein rendering the instruction in a manner that shows the operator how to perform the human-driven task comprises one or more of rendering the first instruction as a readable text instruction that specifies how to perform the first human-driven robot task, rendering a bounding box that visually identifies an object to be interacted with, rendering a visual path that visually indicates how the human-driven robot task is to be performed, or rendering audio instructions.

9. A system for training and testing a robot control module, the system comprising:
a computation device configured to train and/or test a robot control module;
a data collection device configured to collect data related one or more human-driven robot tasks that are to be performed by an operator performing robot action or movement;
one or more sensing devices located in a location of the operator; and
a mixed reality device that is worn by the operator, the system configured to perform the following:
generate at the computation device an instruction specified by a robot control module configured for robot training and/or testing, the instruction indicating how a human-driven robot task is to be performed when training and/or testing the robot control module;
provide the instruction to the mixed reality device worn by the operator, the mixed reality device rendering the instruction in a manner that shows the operator how to perform the human-driven robot task to perform robot action or movement;
collect performance data and environmental data in response to the operator attempting to perform the human-driven robot task specified by the instruction using the data collection device, the collected performance data and the environmental data being collected by one or more of the data collection device and the one or more sensing devices;
receive feedback data in response to the operator attempting to perform the human-driven robot task specified by the instruction using a data collection device; and
update the robot control module using the feedback data and the collected performance and environmental data.

10. The system of claim 9, further configured to perform the following:
in response to receiving the feedback data and the collected performance and environmental data, generating a second instruction specified by the robot control module, the second instruction indicating how a second human-driven robot task is to be performed when training and/or testing the robot control module;
providing the second instruction to the mixed reality device worn by the operator, the mixed reality device rendering the second instruction in a manner that shows the operator how to perform the second human-driven robot task;
collecting second performance data and environmental data in response to the operator attempting to perform the second human-driven robot task specified by the second instruction using the data collection device, the second collected performance data and the environmental data being collected by one or more of the data collection device and the one or more sensing devices;
receiving second feedback data in response to the operator attempting to perform the second human-driven robot task specified by the second instruction; and
updating the robot control module using the second feedback data and the second collected performance and environmental data.

11. The system of claim 10, wherein the second instruction is received in response to the operator being unable to perform the first human-driven robot task.

12. The system of claim 10, wherein the second instruction is received when the second human-driven robot task follows the human-driven robot task.

13. The system of claim 9, wherein the feedback data includes data that has been marked by the operator to indicate if the first human-driven robot task was successfully performed or not.

14. The system of claim 9, wherein the collected performance and environmental data includes data collected by the data collection device, the data collected by the data collection device including sensor data collected from one or more sensors associated with the data collection device when the first human-driven robot task is attempted to be performed.

15. The system of claim 14, wherein the collected performance and environmental data further includes raw visual data collected from the one or more visual sensing devices, the collected raw visual data and collected sensor data being synchronized into a data set that is used to update the robot control module.

16. The system of claim 9, wherein rendering the instruction in a manner that shows the operator how to perform the human-driven task comprises one or more of rendering the first instruction as a readable text instruction that specifies how to perform the first human-driven robot task, rendering a bounding box that visually identifies an object to be interacted with, rendering a visual path that visually indicates how the human-driven robot task is to be performed, or rendering audio instructions.

17. The system of claim 9, wherein the data collection device is one of a human-machine operation interface that is configured to be worn by the operator, hands of the operator, or sensing gloves.

18. The system of claim 9, wherein the robot control module includes one or more of a machine-learning model or a robot control algorithm.

19. The system of claim 9, wherein the feedback data is received in real time.

20. The system of claim 9, wherein the one or more visual sensing devices comprises a bird-view camera that is mounted on a wall or a ceiling of a location of the operator.

* * * * *